Patented Dec. 8, 1931

1,835,404

UNITED STATES PATENT OFFICE

GEORG KALISCHER, OF FRANKFORT-ON-THE-MAIN, FRITZ GÜNTHER, OF LUDWIGS-HAFEN-ON-THE-RHINE, KARL KELLER, OF FRANKFORT-ON-THE-MAIN, AND JOSEF HETZER, OF LUDWIGSHAFEN-ON-THE-RHINE, GERMANY, ASSIGNORS TO GENERAL ANILINE WORKS INC., OF NEW YORK, N. Y., A CORPORATION OF DELAWARE

METHOD OF SULPHONATING BY MEANS OF GASEOUS SULPHURIC ACID ANHYDRIDE

No Drawing. Application filed June 18, 1929, Serial No. 371,954, and in Germany July 6, 1928.

The present invention relates to a process of sulphonating unsaturated fatty acid compounds, for example, unsaturated hydroxy fatty acid compounds, in which the sulphonation is carried out by means of gaseous sulphur trioxide in the presence of an organic diluent.

U. S. application Serial No. 197,223 of Fritz Günther and Josef Hetzer filed June 7, 1927, relates to a process of producing sulphonic acids derived from non-aromatic hydrocarbons containing more than eight carbon atoms in their molecule, which comprises treating said non-aromatic hydrocarbons and their derivatives with sulphonating agents under energetic conditions. As such a sulphonating agent, among others, sulphuric acid anhydride is named.

Our present invention has for its object a new special method for carrying out this sulphonation process. Our new method comprises treating said hydrocarbons and their derivatives with sulphur trioxide in a gaseous form, advantageously in the presence of an organic diluent, while well stirring and cooling. Our new process can be easily carried out practically and enables us to measure the quantity of sulphur trioxide so exactly that each desired degree of sulphonation can be obtained. As starting materials to be sulphonated, particularly unsaturated fatty acids which may contain a hydroxy group are to be named. As organic diluents for example, benzene, carbon tetrachloride, perchloroethane, hexachloroethane and particularly trichloroethylene are suitable.

Advantageously the introduction of sulphur trioxide vapor may be carried out in such a manner, that a current of an inert gas such as air or nitrogen which has been charged with sulphur trioxide vapor, is allowed to enter into the solution of the starting material to be sulphonated.

Especially, when using a solution of an unsaturated fatty or hydroxy-fatty acid, the intensity of absorption of sulphur trioxide is so high, that it is sufficient to allow the sulphur trioxide vapor to pass over the well stirred solution. In this manner the absorption takes place rapidly and can be interrupted for each desired degree of sulphonation.

On the other hand, when sulphonating with concentrated sulphuric acid, an excess thereof is necessary and, when using fuming sulphuric acid, a ballast of sulphuric acid is introduced into the reaction mass. It is an important advantage of our method, that one needs substantially only of such an amount sulphuric acid anhydride as is sufficient for the sulphonation.

In consequence thereof the products of sulphonation require smaller quantities of caustic alkalies for neutralization.

When using unsaturated fatty acids as starting materials, sulphonated derivatives are obtained containing true sulphonic acid groups attached to a carbon atom, which products are distinguished by particularly valuable properties, especially by an extraordinary resistance to acids and lime. When using unsaturated hydroxy-fatty acids, it is necessary, in order to obtain the particularly valuable sulphonation products containing true sulphonic acid groups, to use an amount of sulphur trioxide which exceeds the amount necessary for esterifying the hydroxy groups.

In some cases it may be an advantage to start from hydroxy fatty acid derivatives in which the hydroxy groups have been previously esterified by means of, for instance, sulphuric acid monohydrate or chlorosulphonic acid. But our new method is not only useful for the introduction of sulphonic acid groups into nonaromatic hydrocarbons, but also for each process of sulphonation. Thus when using only such an amount of sulphur trioxide as just effects the esterification of the hydroxyl groups of hydroxy-fatty acids, products are obtained corresponding in their properties with the sulphonated castor oil products of trade. In order to further illustrate our invention the following examples are given, the parts being by weight and all temperatures in centigrade degrees, but it may be understood that our invention is not limited to the particular products or reacting conditions mentioned therein.

Example 1

100 parts of ricinoleic acid are mixed with about 300 parts of carbon tetrachloride; then the solution is cooled down to about −10°, 46 parts of sulphur trioxide vapor are, while well stirring, allowed to pass over the liquor at a temperature of about −10° to −3°, taking care that the absorption of the sulphur trioxide vapor occurs within the aforesaid interval of temperature. When the sulphonation is finished, the compact mass is poured on a small quantity of ice and a dilute caustic soda or sodium carbonate solution is added until a neutral reaction is obtained. The salt solution is then separated off and the carbon tetrachloride is removed by distillation in vacua. A brownish colored oil remains which is not decomposed by prolonged boiling with acids.

Example 2

A slow current of sulphur trioxide is allowed to pass over a solution of 100 parts of castor oil in 150 parts of trichloroethylene at a temperature of about −10° to −3°. When 60 parts of $SO_3$ have been absorbed, the reaction is interrupted and the reaction mass is poured on a small quantity of ice. It is neutralized at about 0 to 3°, with a dilute caustic soda or sodium carbonate solution. The salt solution is then separated off and the trichloroethylene is distilled off in vacuo. The produce obtained corresponds in its properties to that of Example 1, but it surpasses it as to resistance to lime and acids.

Example 3

A solution of 100 parts of castor oil in 300 parts of carbon tetrachloride is previously sulphonated by the action of 30 parts of sulphuric acid monohydrate at 30–40°, whereby the sulphuric acid ester is formed, then the mass is cooled down to about −10° and at −10° to −3° 55 parts of sulphur trioxide are introduced in the following manner: Solid sulphur trioxide is transformed into the gaseous form by heating in a separated vessel and a slow current is allowed to pass over the surface of the sulphonation mass. When 55 parts of sulphur trioxide have been introduced, the mass is poured on a small quantity of ice, separated from the aqueous acid layer and, the other layer containing the carbon tetrachloride is neutralized with a caustic soda or sodium carbonate solution. Then the salt solution is separated off and the carbon tetrachloride is distilled off in vacuo. The remaining product corresponds in its properties to that of Example 2.

Example 4

100 parts of ricinoleic acid are dissolved in about 125 parts of trichloroethylene and previously sulphonated by means of 30 parts of sulphuric acid monohydrate at 30–40°. Then at −10° to −3° 47 parts of sulphur trioxide vapor are introduced into the reaction mass which contains the sulphuric acid ester of ricinoleic acid. The mass is worked up as described above. The product obtained may be evaporated to any degree of concentration. It corresponds in its properties to that of Example 1.

Example 5

Sulphur trioxide vapors are allowed to pass over a solution of 100 parts of castor oil in about 200 parts of carbon tetrachloride which is held at −10° to −3°, until 25 parts of $SO_3$ are absorbed. Then the mass is poured on a small quantity of ice and at about 0 to 10° a caustic soda solution is added until a feeble acid reaction is obtained. The salt solution is then separated off, the carbon tetrachloride is distilled off in vacuo and the remaining yellowish oil shows Turkey red oil-like properties.

We claim:

1. A process of sulphonating an unsaturated fatty acid compound which comprises introducing gaseous sulphur trioxide into a solution of said unsaturated fatty acid compound in an organic diluent.

2. A process of sulphonating an unsaturated hydroxy fatty acid compound which comprises introducing gaseous sulphur trioxide into a solution of said unsaturated hydroxy fatty acid compound in an organic diluent at a low temperature.

3. A process of sulphonating an unsaturated fatty acid compound which comprises introducing gaseous sulphur trioxide into a solution of said unsaturated fatty acid compound in an organic diluent at between about −10° to −3° C.

4. A process of sulphonating an unsaturated hydroxy fatty acid compound which comprises introducing into a solution of an unsaturated hydroxy fatty acid compound in an organic diluent at between about −10° to −3° C., such an amount of gaseous sulphur trioxide as exceeds the amount sufficient for esterifying the hydroxy groups.

5. A process of sulphonating castor oil which comprises introducing into a solution of castor oil in an organic diluent at between about −10° to −3° C., such an amount of gaseous sulphur trioxide as exceeds the amount sufficient for esterifying the hydroxy groups.

In testimony whereof, we affix our signatures.

GEORG KALISCHER.
FRITZ GÜNTHER.
KARL KELLER.
JOSEF HETZER.